May 28, 1946.  J. H. McFARLANE  2,400,941
SUCKER ROD CONNECTION
Filed May 15, 1942

JOHN H. McFARLANE
INVENTOR.

BY Lester B. Clark,
ATTORNEY

Patented May 28, 1946

2,400,941

UNITED STATES PATENT OFFICE 2,400,941

SUCKER ROD CONNECTION

John H. McFarlane, El Dorado, Ark.

Application May 15, 1942, Serial No. 443,045

6 Claims. (Cl. 255—28)

This invention relates to a sucker rod swivel for oil wells, such swivel being so constructed that torsional stresses in the sucker rod tending to twist or unthread the sucker rod are avoided.

The invention comprises an improvement over the device disclosed and claimed in United States Patent 2,132,477 issued October 11, 1938.

As explained in such prior patent, deep oil wells are pumped by means of a jointed sucker rod which extends from the pump plunger deep within the well to a pumping mechanism at the surface whereby reciprocatory pumping action of the rod and plunger is produced. During pumping the rod is subjected to high tensile stresses. Torsional stresses also develop during pumping operations and such stresses tend to twist the rod and, in some instances, to also unthread the joints in the rod. To avoid the torsional stresses and, as well, the tendency for such stresses to disconnect the rod, I provide a swivel which may be connected in the rod at any desired level in the well. Such swivel is so constructed that the ends thereof are relatively rotatable but is also provided with adjacent parts that are non-circular so that a sleeve having a complementary interior surface may be lowered thereover to lock the swivel and thereby provide a rigid connection therewith whenever swiveling action is not desired.

The primary object of the invention is to provide a swivel having adjacent surfaces on parts which are normally relatively rotatable which may be engaged by a member lowered over the sucker rod to engage and lock the parts against relative rotation.

More specifically it is an object to provide a swivel which includes relatively rotatable head and body members, the head member and the adjacent surface of the body members being so contoured as to receive a ferrule to lock such parts against rotation.

It is also an object of the invention to provide a swivel construction in which a body of lubricant is confined therein to lubricate the swivel parts.

Another object is to provide a lubricant-containing swivel in which a ring surrounds the stem extending outwardly from within the lubricant chamber, such ring assuming thrust within the swivel and being efficiently lubricated by the body of lubricant.

The foregoing, together with further objects, will be more fully apparent from the following description taken in connection with the accompanying drawing in which.

Figure 1:
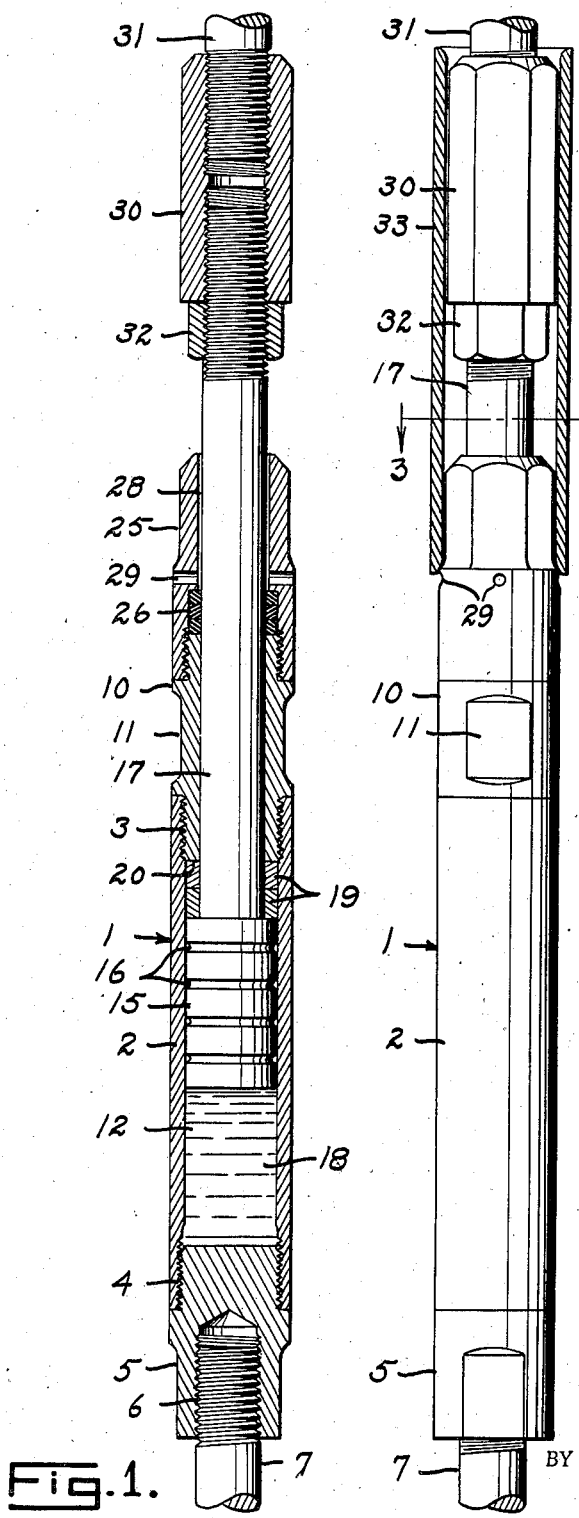
Fig. 1 is a vertical sectional view through a device embodying the invention.

Referring to the drawing, the body 1 is shown as a composite structure comprising a sleeve 2 which is internally threaded at its ends at 3 and 4. A plug 5 closes the lower end of the sleeve 2. This plug has a threaded bore 6 at its lower end to provide connection with a sucker rod section 7 extending downwardly therefrom.

A nipple 10 having a smaller bore than the bore in the sleeve 2 is attached to the threads 3, and this nipple is provided with flat exterior surfaces 11 to facilitate engagement with a wrench or other tool during assembly of the swivel.

Within the chamber 12 formed by the sleeve 2, the plug 5 and the nipple 10, is a piston 15 having a plurality of oil grooves 16 thereon and a stem 17 which passes outwardly through the bore in the nipple 10. The grooves 16 facilitate the maintenance of lubricant about the piston 15 and the stem 17 thereabove. One or more rings 19 surround the stem 17 between the piston 15 and the shoulder 20 at the lower end of the ferrule 10 and serve as thrust rings between the relatively rotatable parts of the swivel.

The body 1 also includes a collar 25 which is threadedly secured to the upper end of the nipple 10. This collar is provided with a counterbore at its lower end to receive the packing 26 to minimize leakage of lubricant from within the chamber 12 and also prevent fluid, which is being pumped, from entering and displacing the lubricant. Above the packing 26 the bore within the collar 25 is slightly larger than the stem 17 whereby an annular space 28 is provided within the collar. At the lower end of such annular space there are a plurality of radial passages 29 so that any foreign matter such as sand entering the space 28 will be readily exhausted from within such space and hence the tendency of the device to stick and thus resist rotation is minimized. The outer surface of this collar is non-circular in cross section as will be later described.

The upper end of the stem 17 is threaded and a head 30 is attached thereto, the upper end of the head being also threaded to receive the lower end of a sucker rod section 31. A lock nut 32 on the stem 17 below the head 30 locks the latter against accidental removal from the stem. This construction is shown as serving as a coupling for the stem 17 and the sucker rod 31.

Figure 2:
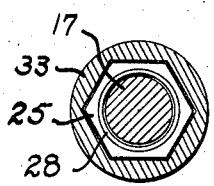
Fig. 2 is an elevation of the device shown in Fig. 1, but showing in section a locking ferrule upon the swivel.
Figure 3:
Fig. 3 is a sectional view taken on the line 3—3 in Fig. 2.

The peripheral surface of the head 30 is non-circular in cross section and is shown in Fig. 3 as hexagonal in shape although it is to be understood that such configuration is not a limitation of the invention. The essential feature is that the periphery of the head 30 and the periphery of the upper end of the collar 25 be of substantially the same non-circular shape in cross section so that a ferrule 33 (Figs. 2 and 3) having a complementary interior surface may be lowered upon the sucker rod and slidably fit upon such surface whereby the body 1 and the head 30 are locked against relative rotation.

The utility and operation of the device of the invention are believed to be apparent from the foregoing description. By way of summary, it may be stated that the swivel forms a connection between successive sections 31 and 7 of the sucker rod string, the swivel being assembled in the manner indicated in Fig. 1 and there being a body of lubricant 18 within the chamber 12. During normal use of the swivel it is to be understood that any tendency toward the development of torsional stresses in the sucker rod string will be avoided due to the freedom of relative rotation between the piston assembly and the body assembly of the swivel. On the downstroke the upper portion of the sucker rod tends to force the stem and piston downwardly and this tendency creates an oil pressure up along the stem to the packing 26, thus oiling the piston, bearings and packing by forced lubrication.

If it be desired, for the purpose of making up a connection which for some reason has become unthreaded below the swivel, to lock the parts of the swivel against relative rotation, the ferrule 33 may be placed over the sucker rod string at the mouth of the well so that such ferrule will move by gravity to the position shown in Fig. 2. Thereupon the upper end of the sucker rod string may be rotated to effect the desired connection.

After such connection has been effected the entire string may be lifted from the well or, if this be deemed unnecessary, the string may be lifted a sufficient distance that the ferrule 33 may be removed therefrom. Thereupon the string and plunger assembly may be lowered into the well for normal operation.

When it is desired to effect a disconnect at some point below the swivel as when the plunger at the lower end of the sucker rod string is stuck, a ferrule 33 is dropped upon the sucker rod string at its upper end and the ferrule moves to the position shown in Figs. 2 and 3. Lefthand or counter-clockwise rotation of the upper end of the string then tends to effect a disconnection at some joint in the string. Inasmuch as this procedure has a greater tendency to unthread a connection near the surface than lower in the well, it is preferable also to apply a lifting force upon the entire string simultaneously with unthreading rotation thereof. The strain thus produced usually results in effecting a disconnection at a lower level than would otherwise occur. The use of the ferrule 33 to interlock the elements of the swivel permits such procedure to be effectively carried out.

Broadly, the invention comprehends a novel sucker rod swivel which operates to avoid torsional stresses in a sucker rod string but which may be locked to prevent relative rotation of the parts thereof.

What is claimed is:

1. A sucker rod swivel comprising a body having a chamber therein and an opening in one end thereof, a piston in said chamber, a stem on said piston extending outwardly through the opening, a head on said stem, removable means for locking the head and body against relative rotation, said last mentioned means comprising non-circular peripheral surfaces on said head and the upper end of the body and a member slidable thereover and having a complemental interior surface.

2. A sucker rod swivel comprising a body having a chamber therein and an opening in one end thereof, a piston in said chamber, a stem on said piston extending outwardly through the opening, there being flat symmetrical peripheral surfaces on the head and the upper end of the body, and a ferrule having an inner complemental surface adapted to fit upon said surfaces and lock the head and body against relative rotation.

3. A sucker rod swivel comprising a body member having a cylindrical chamber therein and an opening in one end thereof, a stem passing through said opening, a piston on the stem in said chamber, a head on said stem exteriorly of the body, a member to engage the surfaces on said head and body members to lock said members against relative rotation, a packing between said stem and body within the opening, said opening being enlarged outwardly from said packing, and passages from said enlargement to the exterior of the body proximate the packing.

4. A swivel coupling for connection of two adjacent sucker rod ends comprising a body threaded to one rod, a stem and coupling threaded to the other rod, a swivel connection between said body and stem, a non-circular area in cross section on each said coupling and body, and a non-circular sleeve, movable along said sucker rod to telescope over said portions to lock the sucker rods above and below the swivel.

5. A sucker rod swivel for use in a well bore comprising a body having a chamber therein and an opening in one end thereof, said body having a non-circular head thereon, a piston in said chamber, a stem on said piston extending outwardly through the opening, a non-circular head on said stem, and removable means slidable over said head and body for locking the head and body against relative rotation.

6. A sucker rod swivel for use in a well bore comprising a body having a chamber therein and an opening in one end thereof, a piston in said chamber, said body having a non-circular portion thereon, a stem on said piston extending outwardly through the opening, a packing surrounding the stem at the upper end of the chamber, a body of lubricant within the chamber, a non-circular head on said stem and removable means slidable over said head and the non-circular portion of the body for engaging and locking the head and body against relative rotation.

JOHN H. McFARLANE.